US005636784A

United States Patent [19]
Huser

[11] Patent Number: 5,636,784
[45] Date of Patent: Jun. 10, 1997

[54] PACK FOR FLOWING MEDIA HAVING A POURING DEVICE, A METHOD FOR THE MANUFACTURE OF A PACK FOR FLOWING MEDIA AND A TOOL FOR CARRYING OUT THE METHOD

[76] Inventor: Pierre Huser, 200 Vandorf Road, Aurora, Ontario, Canada, L4G 3G8

[21] Appl. No.: 403,904

[22] PCT Filed: Jul. 10, 1994

[86] PCT No.: PCT/EP94/02255

§ 371 Date: Mar. 20, 1995

§ 102(e) Date: Mar. 20, 1995

[87] PCT Pub. No.: WO95/03976

PCT Pub. Date: Feb. 9, 1995

[30] Foreign Application Priority Data

Jul. 31, 1993 [DE] Germany ............... 43 25 830.1

[51] Int. Cl.⁶ ........................................... B65D 5/72
[52] U.S. Cl. ............... 229/125.15; 53/133.4; 53/329.3; 53/330; 53/488; 229/125.09
[58] Field of Search ............... 229/125.04, 125.09, 229/125.14, 125.15; 220/339, 359, 306, 375; 53/133.2, 133.4, 329.3, 330, 410, 412, 478, 488, DIG. 2; 156/69, 583.1; 222/481, 482, 545, 546, 562, 563

[56] References Cited

U.S. PATENT DOCUMENTS

| | | | |
|---|---|---|---|
| 2,690,861 | 10/1954 | Tupper | 220/375 |
| 3,744,662 | 7/1973 | Zundel | 220/339 |
| 3,864,186 | 2/1975 | Balla | 156/272 |
| 4,055,032 | 10/1977 | Hammond . | |
| 4,566,250 | 1/1986 | Matsumura et al. | 53/133.2 |
| 4,732,315 | 3/1988 | Gunn | 229/125.09 |
| 4,770,325 | 9/1988 | Gordon et al. | 222/481 |
| 4,779,397 | 10/1988 | Christine et al. | 53/410 |
| 4,852,764 | 8/1989 | Stone | 220/315 |
| 4,909,434 | 3/1990 | Jones et al. | 220/359 |
| 4,930,683 | 6/1990 | Farber | 229/125.09 |
| 4,948,015 | 8/1990 | Kawajiri et al. | 222/107 |
| 5,027,979 | 7/1991 | Kawajiri et al. | 222/83 |
| 5,058,360 | 10/1991 | Yamazaki et al. | 53/133.2 |
| 5,065,938 | 11/1991 | Anderson | 220/339 |
| 5,069,385 | 12/1991 | Farber | 229/137 |

(List continued on next page.)

FOREIGN PATENT DOCUMENTS

| | | | |
|---|---|---|---|
| B20817 | 3/1995 | Australia . | |
| B71520 | 7/1995 | Australia . | |
| 342729 | 11/1989 | European Pat. Off. . | |
| 435279 | 7/1991 | European Pat. Off. | 229/125.15 |
| 4100542 | 2/1992 | Germany . | |
| 681797 | 5/1993 | Switzerland | 220/339 |
| WO016982 | 5/1982 | WIPO . | |
| WO00884 | 1/1992 | WIPO . | |
| 9200883 | 1/1992 | WIPO . | |
| 9310967 | 6/1993 | WIPO . | |

OTHER PUBLICATIONS

German Search Report dated Feb. 10, 1994.
International Search Report dated Dec. 12, 1994.

*Primary Examiner*—Gary E. Elkins
*Attorney, Agent, or Firm*—Paul & Paul

[57] ABSTRACT

A pack for liquids having a flat top wall portion of plastics-coated cardboard in which a pouring device is arranged. A method of manufacturing an improved pouring device, economically and in a technically simple way, and which pouring device can be opened easily by the end user and closed again in such a way that it is even liquid-tight. The pouring device having a bottom part containing two holes and a cover connected thereto in hinge-like manner and containing two closure caps, with a collar surrounding each hole outwardly, the respective closure cap having a sealing lip which can be engaged with the collar, and arranged on the inside, oppositely disposed to the respective collar, of the bottom part is a shoulder which projects through a corresponding hole in the top wall portion to the inside of the pack, with the bottom part welded to the outer face and inner face of the top wall portion.

10 Claims, 7 Drawing Sheets

U.S. PATENT DOCUMENTS

| | | | |
|---|---|---|---|
| 5,158,633 | 10/1992 | Rausing | 229/125.14 |
| 5,169,374 | 12/1992 | Abrams et al. | 493/87 |
| 5,199,635 | 4/1993 | Abrams et al. | 229/125.09 |
| 5,287,983 | 2/1994 | Reil et al. | 220/258 |
| 5,348,182 | 9/1994 | Luch | 229/125.15 |
| 5,364,019 | 11/1994 | Bjorck et al. | 229/125.09 |
| 5,366,433 | 11/1994 | McCormick | 53/133.2 |
| 5,435,803 | 7/1995 | Owen et al. | 53/410 |

PACK FOR FLOWING MEDIA HAVING A POURING DEVICE, A METHOD FOR THE MANUFACTURE OF A PACK FOR FLOWING MEDIA AND A TOOL FOR CARRYING OUT THE METHOD

The invention relates to a pack for flowing media having at least one substantially flat top wall portion of plastics-coated carrier material, e.g. cardboard, in which a pouring device is arranged. The invention also relates to a method of manufacturing a pack of the afore-described kind, and finally the invention relates to a tool for carrying out the method.

The manufacture of packs made of composite material, e.g. of plastics-coated cardboard as the carrier material is known. These packs are manufactured in high capacity machines in which the web of composite material is drawn from a roll, pre-grooved and possibly pre-stamped and then shaped into a tube which is closed at its longitudinal edges by a longitudinal sealing seam. The subsequent contents are filled into this tube, and the individual, filled packs are separated from the tube and shaped by transverse sealing, so that parallelepipedal packs finally result. These packs have transverse sealing seams on the bottom and top wall which are folded down to form flat bottoms and flat top walls and which are laid over in such a way that triangular flaps project laterally which are laid over onto the side wall and welded there.

A pack for liquids which is manufactured in this way therefore has a top wall formed from three portions in which, for example, the longitudinal sealing seam which is laid over flat as well intersects the transverse sealing seam in the centre.

Numerous opening devices have been developed on packs of this kind and published. Opening devices exist which are formed from the web material, e.g. by perforated lines and tear lines, wherein these packs can admittedly be opened satisfactorily, but cannot be readily closed again, cannot usually be sealed to dust and can almost never be re-closed in liquid-tight manner. Other pouring devices also exist which are formed by sealing on tear open strips which bridge and close a hole stamped out in the web of material of the pack. With other devices, cover strips are sealed onto the inside so that the outer tear open strip is sealed through the hole to the inner cover strip. When the outer strip is torn away, it tears the inner cover strip in the region of the hole stamped out in the paper web. Many known tear open strips are torn off when the pack is opened for the first time and form waste. Other tear open strips have been sealed on to one side in such a way that they continue to be stuck to the pack after the hole on the pack has been opened. None of these pouring- and opening devices permitted dust-proof or even liquid-tight re-closure.

Whereas other pouring devices are manufactured by injection-moulding thermoplastics plastics materials, and are arranged on holes of packs which can also be re-closed, it has been seen that the manufacture or arrangement of these pouring devices either gave rise to problems or was very expensive.

The aim of the present invention is therefore to provide the pack of the kind mentioned in the introduction with an improved pouring opening which can be manufactured economically and in a technically easy way, and which can be opened easily by the end user and re-closed in such a way that the pack is liquid-tight.

This problem is solved according to the invention in that the pouring device has a bottom part containing at least one hole and a cover connected thereto in hinge-like manner and containing at least one closure cap, that a collar surrounds the hole outwardly, the closure cap has a sealing lip which can be engaged with the collar, and that on the inner side, oppositely disposed to the collar, of the bottom part, is arranged a shoulder which projects through a corresponding hole in the top wall portion towards the inside of the pack, and the bottom part is welded to the outer- and/or inner face of the top wall portion.

Although the hole in the bottom part of the pouring device, and possibly also the corresponding hole in the top wall part can be polygonal, drop-shaped, oval, elongate or circular, for the purpose of simplifying the drawing and to facilitate understanding of the invention it is assumed here that the hole is circular. However, the invention is not restricted to this. The arrangement of a pouring device in the top wall of a pack is known. However, the present invention talks of a top wall portion since a top wall can be composed of a plurality of portions and the pouring device according to the invention is only arranged in one chosen portion.

According to the invention, the pouring device is formed in one piece, wherein, however, a bottom part is joined to a cover by way of a hinge-like articulation. A hole is disposed in the bottom part, which hole can be closed in liquid-tight manner by a closure cap if the cover which contains that closure cap is folded along the hinge in such a way that the main plane of the cap comes to lie parallel with that of the bottom part.

The liquid-tight property of the pouring device according to the invention results from the afore-mentioned sealing lip on the closure cap around the entire hole sealingly engaging with the collar of the bottom part. Thus, if the closure cap is lifted off, i.e. if the cover is lifted off by pulling it up and rotating it about the hinge axis away from the outwardly projecting collar of the bottom part, then the hole is open through the bottom portion and the top wall portion, so that the contents can be emptied from the pack. Similarly, the pouring device can be closed again in reverse manner after part of the contents have been emptied.

An injection-moulding method can be used to manufacture a pouring device of thermoplastics plastics material of the afore-mentioned kind in a cost-effective and technically good way. The shoulder of the pouring device which is disposed in the hole in the top wall portion or which projects through the hole simultaneously protects the cut edges in the web of paper around the edge of the hole which are exposed due to the stamping out of the hole. If the bottom part is welded at least to the inner face of the top wall portion, if the flowing media is a liquid it cannot penetrate the open cut edges of the composite material of the pack anywhere and destroy it, for the pouring device exposes only plastics surfaces to the liquid which are impermeable to liquids.

The plastics material used to manufacture the pouring device can be high density polyethylene which does not alter the taste in the case of foods and which is admissible with foods. Conventional packs made of plastics-coated paper can therefore be readily provided with the pouring device according to the invention and filled with milk, juices, water, cooking oil and other flowing media.

It is particularly advantageous according to the invention if the upstanding collar on the outside of the bottom part widens outwardly to form an offset portion, and if the closure cap has an outer edge which embraces the collar outwardly in the closed condition, the end of which outer edge is of increased thickness inwardly to form a snap-shut bead. This design of pouring device enables the closure cap to be firmly held to the bottom part in the closed condition after it has been pressed on. Thermoplastics materials are elastic, so that on being closed, the snap-shut bead of increased thickness of the closure cap can be pressed over the outside of the collar in such a way that the outer edge is held firmly after it has been pressed on, for the snap-shut bead lies around the circumference, e.g. annularly in the offset portion on the collar. On the other hand, this holding force which is the same as a clamping force can easily be surmounted by the end user to open the pack because the outer edge of the closure cap can, in turn, easily expand and be pulled up over the collar to open the hole.

With another advantageous embodiment of the invention, in the extension of the shoulder on the bottom part is arranged a fixing edge which extends on the inner face of the top wall portion. This is an advantageous way of securing prefabricated pouring devices to the holes of packs. In the application station of the packaging machine, for example, the main plane of the pouring device is placed onto the top wall portion in such a way that both planes are substantially parallel to each other. With the bottom part of the pouring device according to the invention this is achieved by the shoulder being inserted through the hole in the paper web by way of its fixing edge arranged in the extension of the shoulder, whereupon a suitable welding tool deforms the fixing edge in rivet-like manner, and is welded to the inside face of the top wall portion. The term, "inner face" is used to refer to the face of the top wall portion which is later to the inside of the ready pack.

It is also favourable according to the invention if the bottom part contains in a substantially flat connecting web portion two holes of different diameter arranged at a spacing apart, the larger hole off which is arranged near the edge between the top- and side wall of the pack for pouring out the contents, and the pouring edge, opposite the hinge, of the connecting web portion which embraces the larger hole is preferably disposed over the edge between the top wall and the side wall. In this way, a large pouring hole is obtained and a smaller ventilation hole at a spacing behind it, which ventilation hole is free of contents during pouring and allows the emptied contents to be replaced by inflowing air. It is easy to form a connecting web portion of varying lateral width in the main plane of the bottom part which is advantageous in that it surrounds the holes and joins the two surfaces together. Therefore, a bottom part is formed in a simple way which offers a flat surface around the collar of the respective hole and which is disposed parallel to the plane of the top wall portion and which can be welded to the outer surface of the top wall portion, if necessary. Therein, it would, however, be sufficient to weld the bottom part to the top wall portion around the holes. If necessary, it is also possible to provide a web portion between the two weld rings. The skilled person, and, in particular, the end user, will immediately see the technical advantage of the flat connecting web, in particular of its portion which surrounds the larger hole because this forms the pouring edge at the outlet side, thus creating a tearing aid for the pouring jet, without special operations or materials having to be used additionally.

It is also expedient according to the invention if the cover is provided with a tear open handle, one end of which is joined to the cover at the side oppositely disposed to the hinge. Admittedly, it is possible to provide the cover on the side of the pouring edge with an attachment piece or a projecting gripping aid, but it is very practical and comfortable for the end user to use a tear open handle which is secured to the outer edge of the cover on the pouring edge side, on the one hand, and which is secured in the region of the hinge or the closure cap disposed there, on the other hand. The user immediately sees this tear-open handle, takes hold of it and introduces the opening forces at the correct place to pull up the outer edge of increased thickness with its snap-shut bead uninterruptedly and quickly over the collar of the bottom part. An opening aid of this kind considerably facilitates handling of the device according to the invention. Therein, on one edge of the cover or at one place on the tear open handle it is also possible to provide a connection to the bottom part which is provided with a nominal breakage location, i.e. to guarantee the genuine newness of the pack. The porting device according to the invention can then only be opened if the nominal breakage location has been opened. From this place which may be clearly identified, it is immediately possible for the user to see whether the pouring device has already been opened.

The aim of the invention is solved with a method for manufacturing a pack for flowing media having at least one substantially flat top edge portion of plastics-coated carrier material, e.g. cardboard, in which a pouring device is arranged which has a bottom part containing at least one hole and a cover connected in hinge-like manner thereto and containing at least one closure cap in that the web of composite material which may contain an aluminium coating on the inside of the pack is stamped, after grooving, to form the, at least one, hole, and a pouring device of thermoplastics plastics material is then placed at the stamped out hole in the top wall portion, and is welded on in the next stage, whereupon the web is shaped into a tube, filled and welded.

By way of this method it is possible to use conventional packaging machines and to produce packs in the conventional way from a web of composite material, without the machine having to be changed in an additional step. Commercially available machines can be used in this way to place 6,000 pouring devices or more per hour on stamped holes in a paper web, and the web can be operated at the appropriate capacity. In this respect, it is possible to operate in two alternative ways, e.g. the first possibility consists of three different stages, namely stamping, arranging the pouring device on the stamped hole, and then welding the pouring device on in the third stage. The other possible alternative consists of two steps, namely a first step where the hole is stamped out of the web; and a second step where the pouring device is arranged and simultaneously sealed to the stamped out hole. The latter alternative which has just two steps requires less maintenance, but requires a somewhat more expensive additional stage in the packaging machine. Nonetheless, already existing technology and machines can be used.

It is also favourable according to the invention, if, when the web is made of aluminium-coated composite material, the web is heated by induction and is joined to the pouring device. It is known to place certain liquid foodstuffs in parallelepipedal packs of composite material and to protect them from external influences by an aluminum coating which is preferably arranged on the inside of the pack. If this type of composite material is used, the heat for welding on the pouring device according to the invention can then be produced by induction.

The tool for carrying out the method of the aforedescribed kind, in particular for fixing the pouring device to the top wall portion, which tool has heating jaws and companion jaws which can be moved relative to each other, is characterised in that a heating jaw which engages over the hole in the top wall portion is movably provided on the subsequent inner side of the web and is provided with a central projection which in diameter is approximately equal to the internal diameter of the sealing lip on the closure cap, and that the projection is of a height which is somewhat greater than the thickness of the material of the top wall portion. With this preferred embodiment, the heating jaws with the projection represent a type of rivetting tool, for the region from the projection to the surface of the heating jaw which is a shoulder-like surface is preferably rounded and is even in such a way that when the heating jaw moves onto the secured pouring device the afore-mentioned fixing edge is grasped, and, as with a rivet-like fixture, is bent under the edges of the hole in the composite material.

It is also expedient if arranged in the offset shoulder face of the heating jaw is an induction-/heating coil which embraces the projection. If space is very restricted, the tool can therefore be provided with induction coils or heating coils, so that the edges of the composite material next to its stamped out hole can be heated properly and thoroughly, so that the plastics pouring device is securely and reliably fixed by welding to the composite material Further advantages, features and possible applications of the present invention will emerge from the following description of preferred embodiments in conjunction with the accompanying drawings, wherein:

Figure 1:
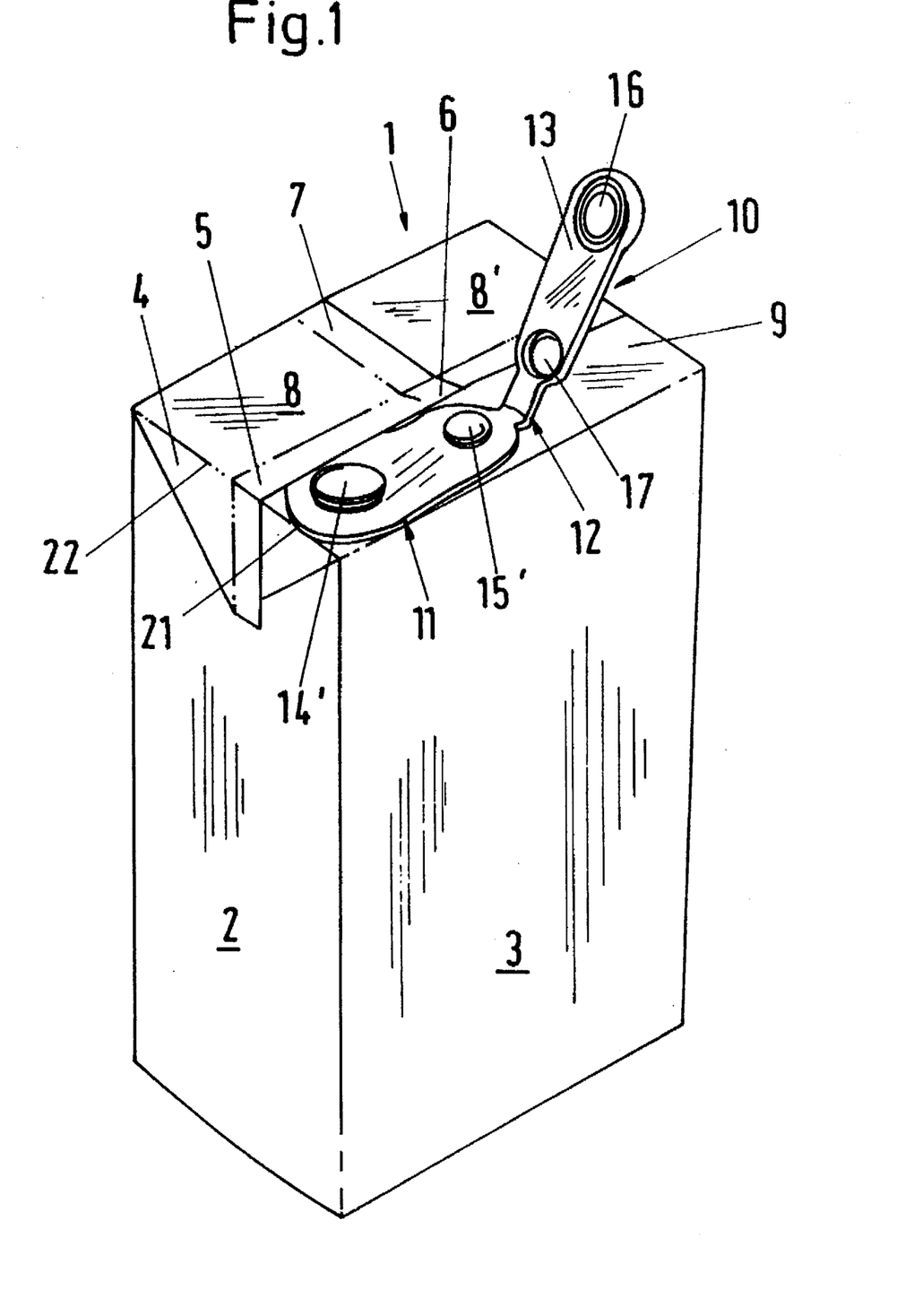
FIG. 1 shows a parallelepipedal pack, in perspective, with the pouring device according to a first embodiment.

FIG. 1 shows a parallelepipedal pack for liquids with a top wall, generally denoted by the reference numeral 1, with a narrow side wall 2 and a wide side wall B, wherein the other side walls and the bottom are not shown. Triangular flaps 4 are formed in the region of the top wall 1 by the transverse sealing seam 5, and it is also possible to see the place of intersection 6 where the transverse sealing seam 5 is intersected by the longitudinal sealing seam 7. Thus, on either side of the longitudinal sealing seam 7, to the top in the region of the top wall 1, are two so-called upper portions 8, 8' and a lower top wall portion 9.

The pouring device, generally denoted by the reference numeral 10, is arranged in this lower top wall portion 9. Another embodiment of a pouring device of this kind is to be seen in the plan view of FIG. 2. The composite material of which the pack according to FIG. 1 is made is plastics-coated cardboard, the inside of which is coated additionally with aluminium foil.

Figures 2, 3, 3B:
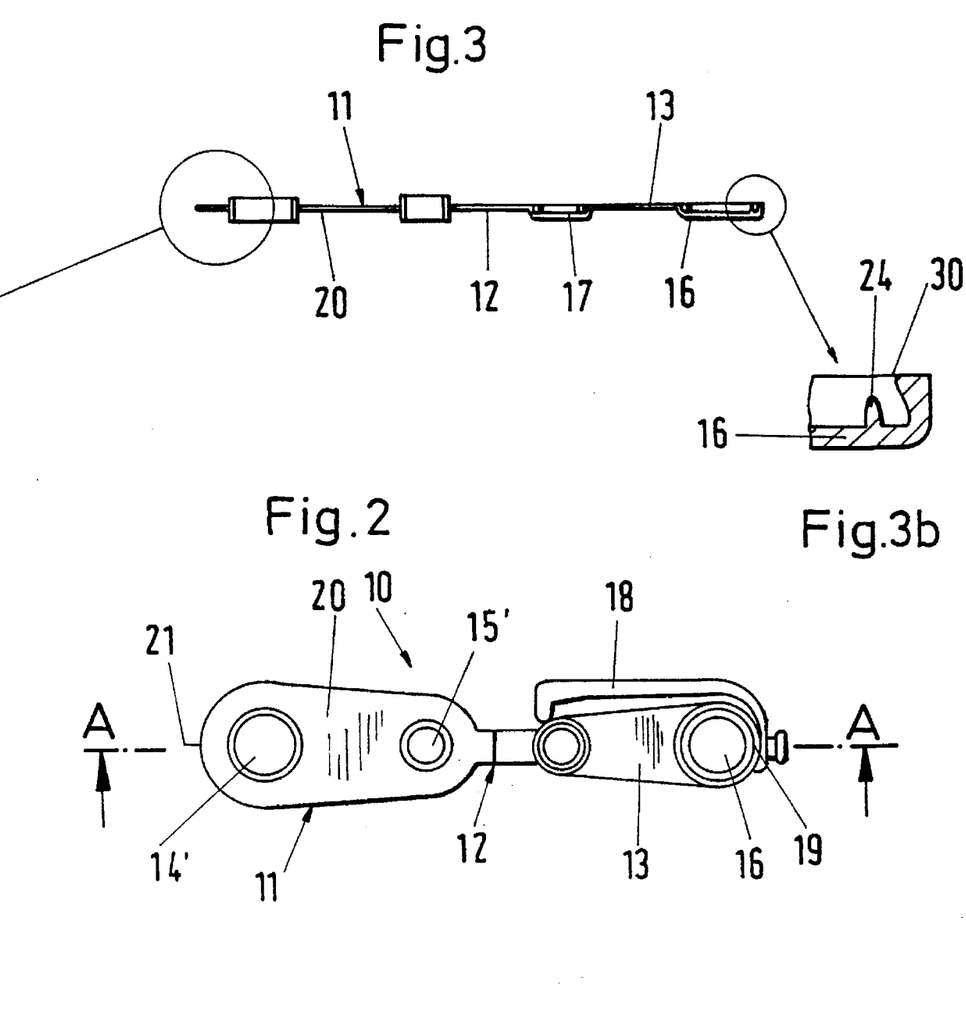
FIG. 2 is a plan view of a pouring device according to a second embodiment.
FIG. 3 is a sectional view through the embodiment of FIG. 2, along the line A—A.
FIG. 3b is a detail, in section and on a large scale, of the right-hand part of FIG. 3, marked by a broken line by way of a circle.

In the embodiment shown here, the pouring device 10 consists of a bottom part 11 and a cover 13 connected thereto by way of a hinge 12.

Figure 4:
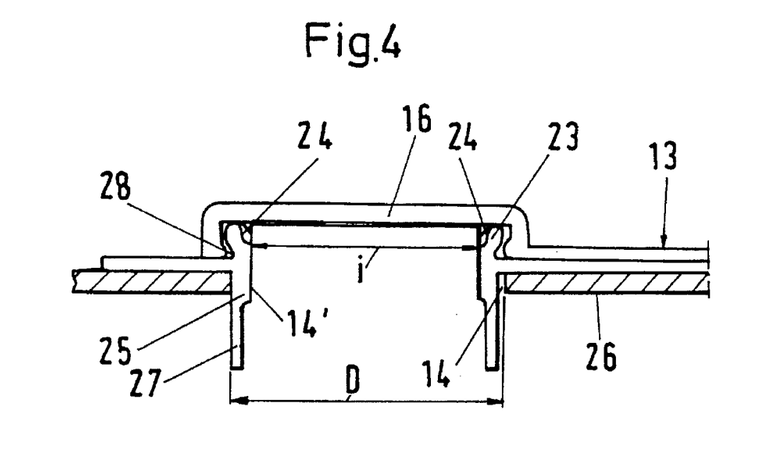
FIG. 4 is a cross-sectional view, truncated and on a large scale, through the top wall portion with a pouring device which has already been placed on it but which has not yet been fixed.
Figure 6:
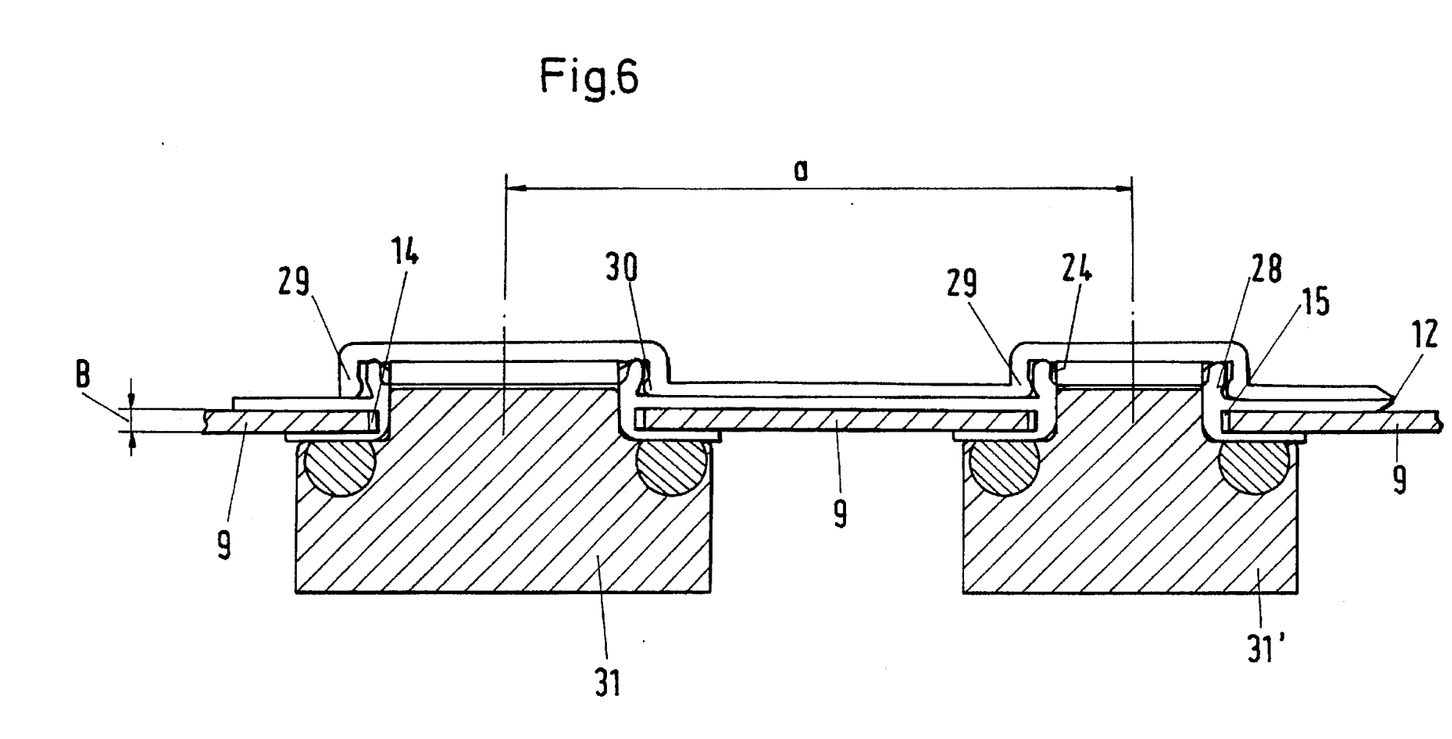
FIG. 6 shows engagement of the tools with the pouring device and the top wall portion during welding or fixing.

As can also be seen in FIGS. 4 and 6, two holes 14 and 15 of different diameter are stamped out in the top wall portion 9. The larger hole 14 is of diameter D, whereas the smaller hole 15 is of the diameter d. In a similar way, the bottom part 11 also contains two holes 14' and 15' which can be closed by the two closure caps 16 and 17 of the cover 13.

In comparison with the embodiment of the closure cap 10 according to FIG. 1, that according to FIGS. 2 and 3 additionally has a tear open handle 18 on the side of the cover, the one end of which handle, namely the end shown to the left in FIG. 2, is stuck on in the region of the small closure cap 17, whilst the end of the tear open handle 18 opposite that side is arranged close to the closure cap 16 at the location 19.

In the two-hole embodiment shown here, the bottom part 12 has a connecting web portion 20 which surrounds the two holes 14' and 15' and whose edge opposite the hinge is the pouring edge 21 which is disposed in FIG. 1 over the edge 22 between the top wall 8, 9 and the side wall 2. In the cross-sectional drawing of FIGS. 4 and 6, a collar 23 surrounds each of the holes 14' and 15' outwardly. The respective closure cap 16 and 17 has a sealing lip 24 which can be sealingly engaged with the collar 23. A shoulder 25 is formed on the inside of the bottom part 11, opposite the collar 23. This shoulder projects into the respective hole 14 or 15 in the top wall portion 9 to the inside of the pack. The bottom part 11 is welded by welding tools to be described hereinafter either around just the holes 14 and 15 of also along a connecting web portion between the holes 14 and 15 on the top wall portion 9. This is the fixture from outside. A fixing edge 27 is welded to the inner face 26 of the top wall portion 9, after it has been bent over into the plane which is parallel to that of the top wall portion 9, as shown in FIG. 6.

Figure 3A:
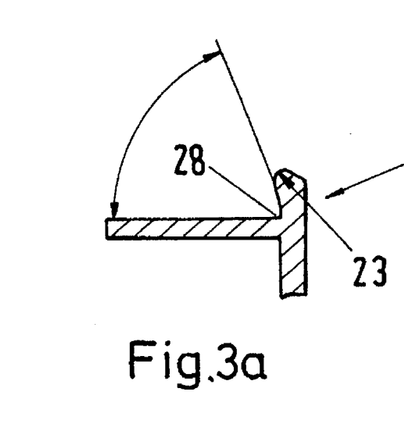
FIG. 3a is a detail from the left-hand part of FIG. 3.

It can also be seen, particularly in FIGS. 4 and 6, that the collar 23 which projects outwardly from the bottom part 11 widens outwardly to form an offset portion 28. The closure cap 16 or 17 has an outer edge 29 which engages around the outside of the collar 23 in the closed condition of the pouring device 10. The end of the outer edge 29 is of increased thickness inwardly to produce a snap-shut bead 30. When pressed, this is able to move into the offset region 28 shown by the angle in FIG. 3a.

Figure 5:
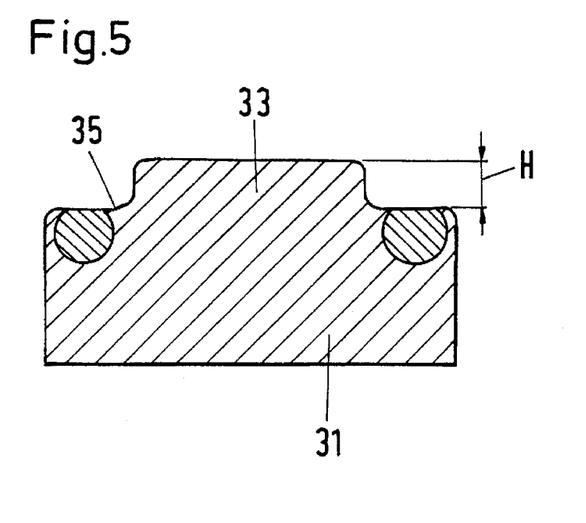
FIG. 5 is a heating jaw in the form of a rivet tool.
Figure 5A:
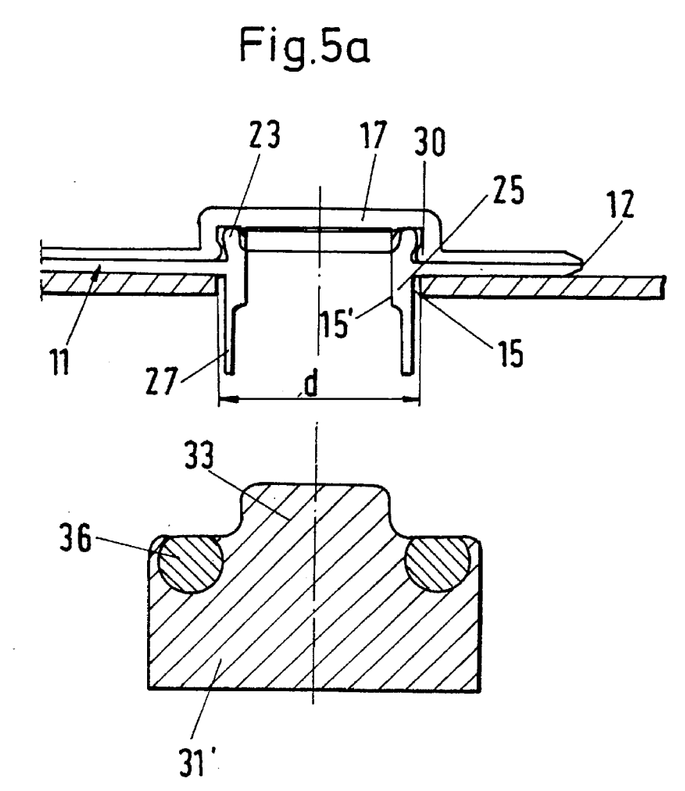
FIG. 5a is the same view as FIG. 5, but with a differently sized heating jaw for the hole with closure means of smaller diameter.

In FIGS. 5, 5a and 6, heating jaws 31, 31' are shown in the form of a rivet tool. They are movable on the inner face 26, which faces the inside of the pack, of the web 32 shown in FIG. 7. In the centre, each heating jaw 31 or 31' has a central projection 33 which is approximately equal in diameter to the internal diameter (i) of the sealing lip 24 on the closure flap 16 or 17. The height H of the projection 33 is somewhat greater than the thickness B of the material of the top wall portion 9, possibly twice as thick, to produce the rivetting function of the heating jaws 31 and 31'. An induction coil 36 is arranged in the offset shoulder face 35 of the heating jaw 31 and 31', and, in FIGS. 5, 5a and 6, these heating coils are shown by flat circles filled in in black. These induction coils 36 circularly surround the projection 33.

Figure 7:
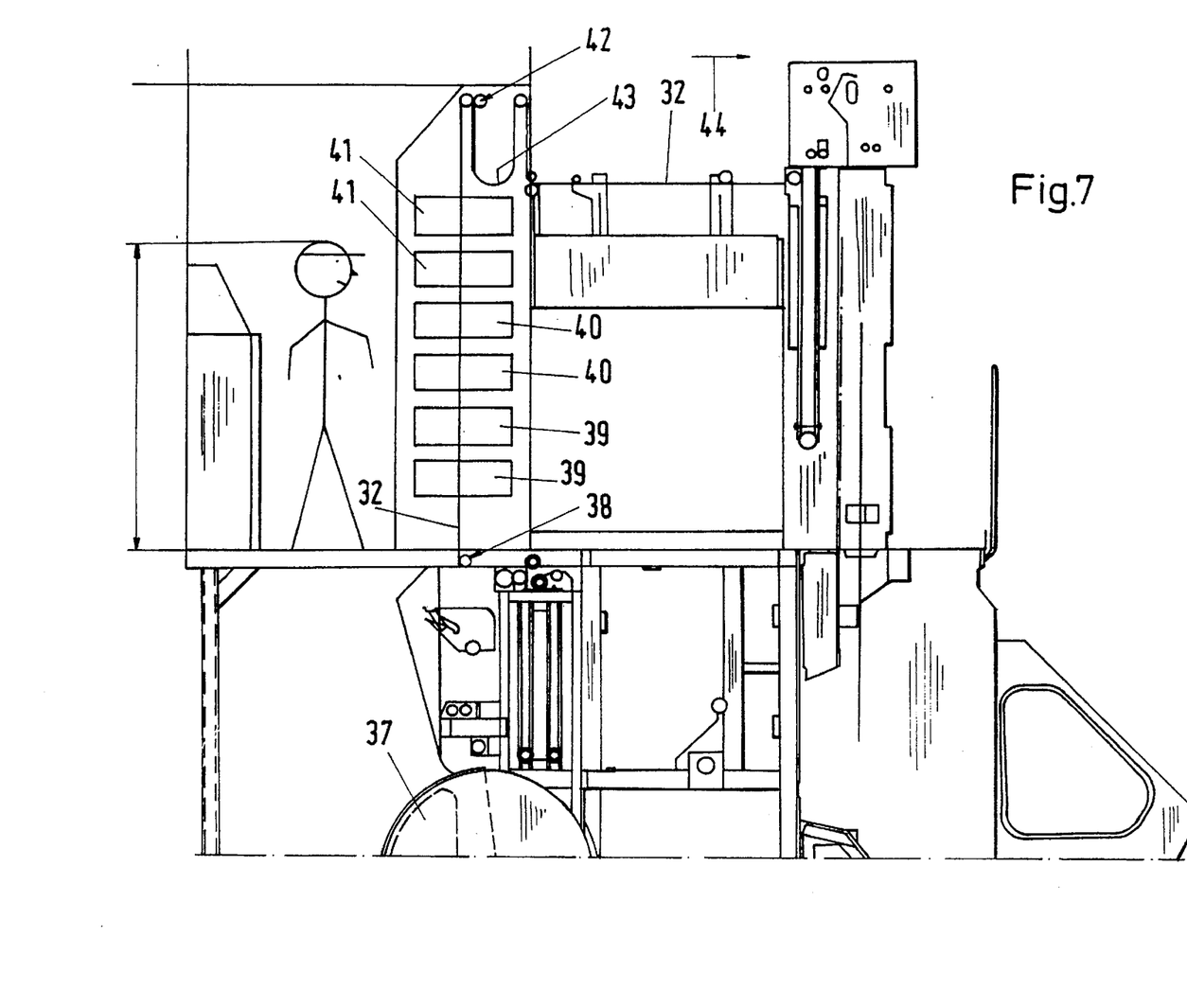
FIG. 7 is an illustration, broken away, of the side view of a pack machine which is arranged upstream of the devices for fixing the pouring device.

With the machine shown in FIG. 7, a web 32 of composite material is drawn upwardly from a supply roll 37 and is moved intermittently by a pulling device 38. The web is stamped simultaneously in two stamping stations 39, giving rise to the two holes 14 and 15. In the next step, after the web 32 has been moved further upwards, the two pairs of holes have arrived in the stations 40 where a pouring device 10 is arranged on the holes, as shown in FIG. 4. The embodiment of FIG. 4 differs slightly from that of FIG. 3 where no fixing edges 27 are used.

The pouring devices 10 which are put on in the application station 40 are then welded onto the web 32 in the station 41 after the next conveyance step of the web 32, as shown in FIG. 6. With this embodiment with the fixing edge 27, the heating jaws 31 and 31' are responsible for laying over the fixing edges 27 into the horizontal position shown in FIG. 6 and for then welding them to the underside 26 of the top wall portion 9 by actuating the induction coils 36.

A servo drive 42 with buffer slide 43 is then responsible for moving the web 32 further in the direction of the arrow 44, to the right in FIG. 7, where it enters the conventional packaging machine, i.e. the tube is formed and the pack is then produced until it is ready.

Figure 8:
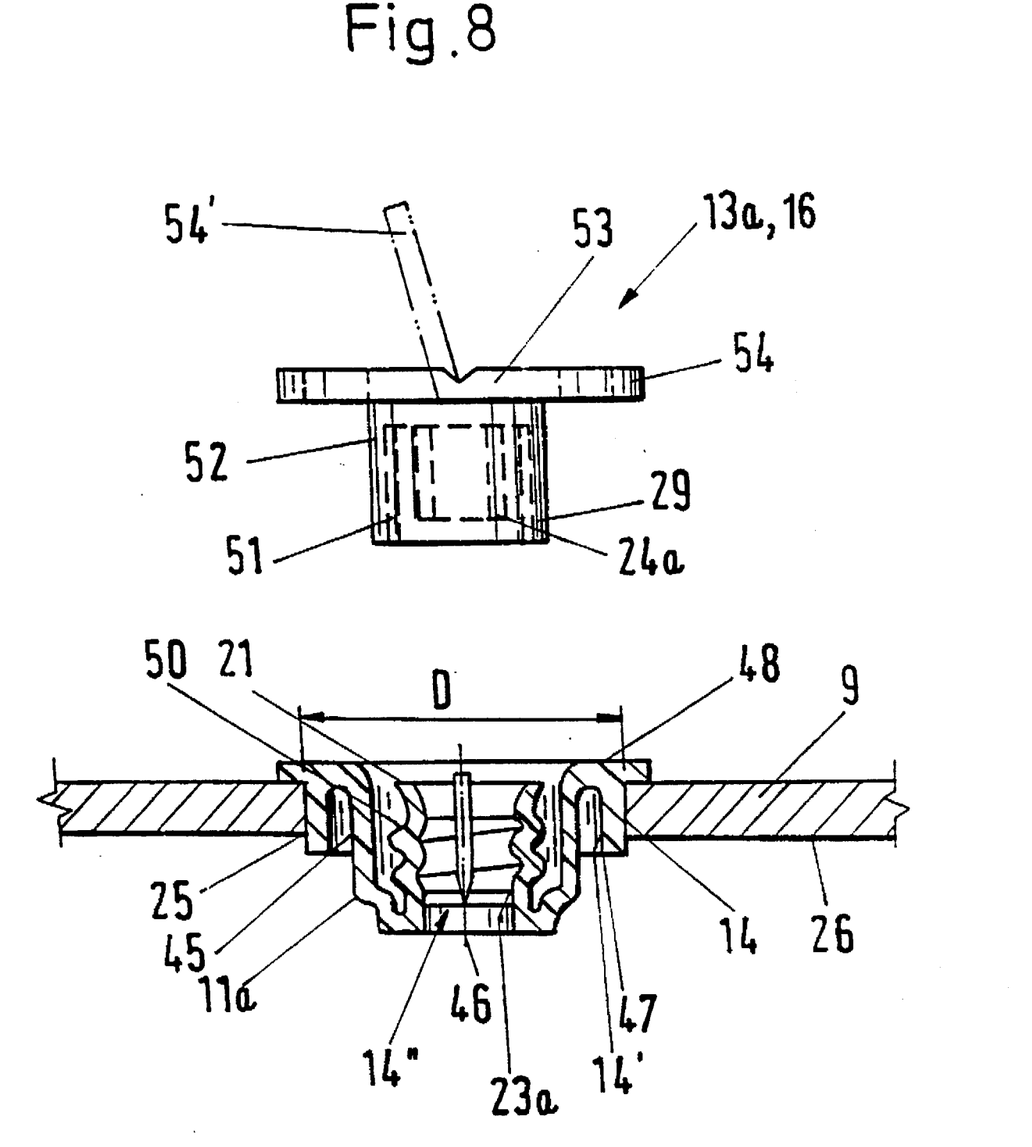
FIG. 8 is a sectional view of another embodiment of a pouring device for pasty or oily contents.
Figure 9:
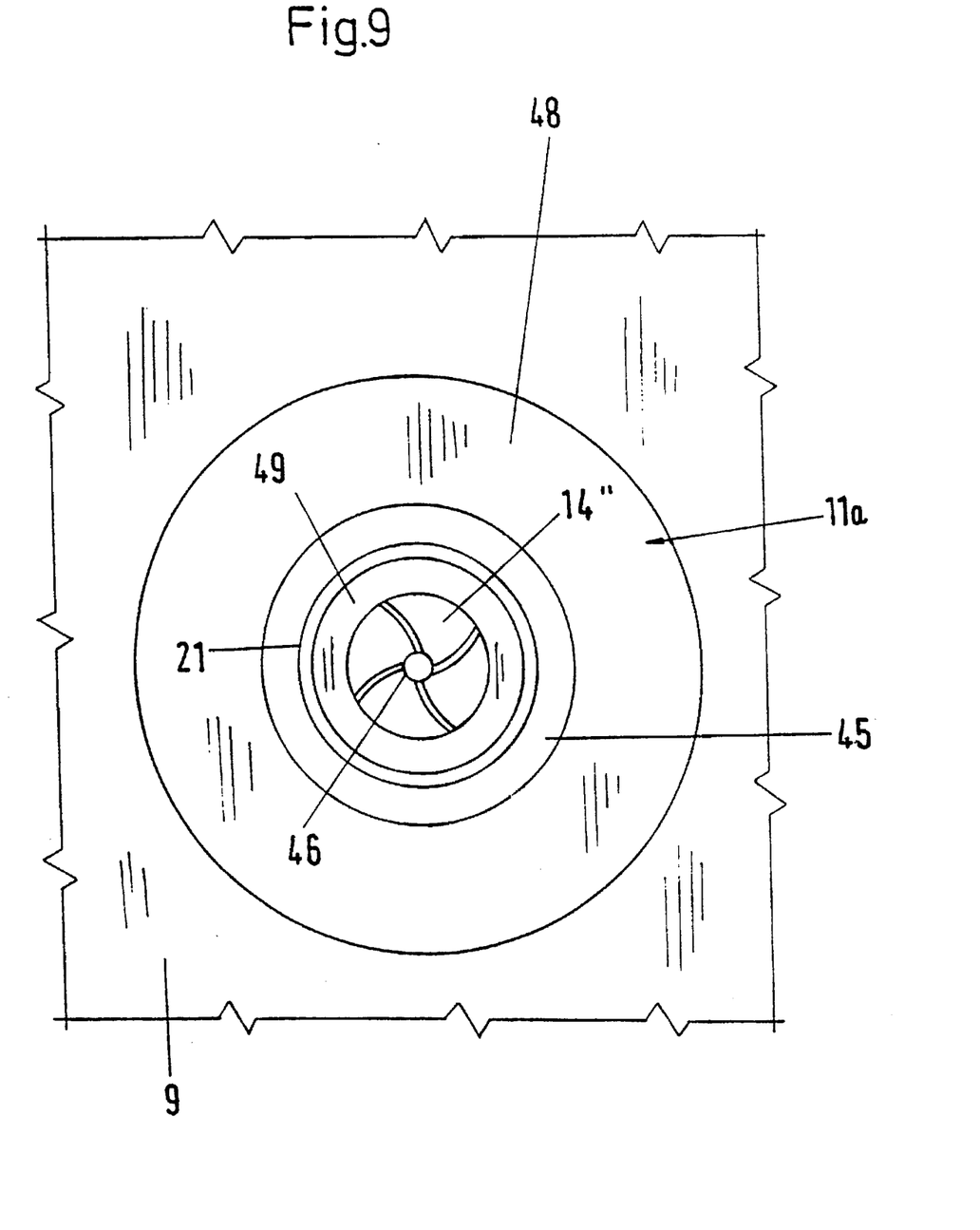
FIG. 9 is a plan view of the bottom part of the pouring device according to FIG. 8.

Another embodiment of a pouring device 10 is shown in FIGS. 8 and 9. FIG. 8, bottom, shows the broken away cross-section of the top wall 9 in which the bottom part 11a is inserted and firmly welded in the hole 14 of the top wall 9 with the aid of the shoulder 25. In the top part of FIG. 8 it is possible to see the cover 13a, designated as the closure cap 16. With the embodiment shown here, the closure cap 16 is separate from the bottom part 11a; however, it is quite easily possible for the two to be connected together by way of a hinge, not shown, in such a way that the closure cap can be moved and pivoted relative to the bottom part in a similar way as mentioned in connection with the afore-described embodiments. By way of example, the hinge which is not shown can have a hole at the end which is remote from the bottom part 11a in such a way that the closure cap 16 can be rotated in or in relation to the hinge.

Between the collar 23a and the shoulder 25 which is disposed in the region of the top wall 9, the bottom part 11a of this new embodiment has an intermediate piece 45 which can be deformed like a bellows and which is exceeded in length by the bottom part in the direction of its longitudinal central axis 46. In other words, this intermediate piece 45 considerably increases the distance between the bottom edge 47 of the shoulder 25, at the bottom, and the pouring edge 21, at the top. A pouring device of this kind is particularly suitable for pasty or oily contents, e.g. mustard, mayonnaise, ketchup, oil, or the like. When the contents are poured out, they cannot easily moisten the pack or run down onto the region of the top wall 9.

The shoulder 25 is fixed in the hole 14 in the top wall 9 by means of adhesive, by welding, or by hot melt. An annular flange 48 extends perpendicularly to the annular wall of the shoulder 25, and covers it over. At the same time, the annular flange 48 is responsible for centering and holding it to the edge of the hole 14 of the top wall 9.

The plan view of FIG. 9 shows the bottom part 11a in the upwardly pulled out position of use, and a view is taken from the outside to the inside, firstly onto the afore-mentioned annular flange 48 to the inside of which the intermediate portion 45 is attached which can be deformed like a bellows. From the top it is then possible to see the pouring edge 21 which is drawn in, in frustoconical fashion, and possibly rounded in cross-section, inwardly towards the opening of the hole 14", as shown in FIG. 8. The ping 49 arranged between it in FIG. 9 is the inner wall of the upstanding collar 23a which bears an outer thread 50 which is not visible in FIG. 9, but which is shown clearly in the cross-section of FIG. 8.

When the intermediate portion 45 which can be deformed like a bellows is in the collapsed condition, FIG. 8, bottom, sufficient space remains between the outermost surface of the collar 23a and its outer thread 50, on the one hand, and the inner face of the intermediate piece 45, on the other hand, to receive an annular wall of the closure cap 16.

The inner thread 51 of the closure cap 16 which is shown in FIG. 8, top, corresponds to the outer thread 50 of the collar 23a. This has an outer wall 52 which forms a cylindrical casing with said inner thread 51 and the outer edge 29, so that the closure cap 16 can be screwed onto the outer thread 50 of the collar 23a, both during manufacture of the bottom part 11a when the deformable intermediate portion 45 is pulled up and the outer surface of the intermediate piece 45 is disposed above the annular flange 48 and projects outwardly, and also in the collapsed condition of FIG. 8. A sealing lip 24a in the cylindrical casing of small diameter such that it lies at a spacing from the inner thread 51 of the outer wall 52 can sealingly engage with the collar when the closure cap 16 is screwed onto the collar 23a. The closure cap 16 is closed upwardly by a disc 53 on which a handle 54 is also arranged, whose upwardly pulled position is shown by broken lines in FIG. 8, top, and indicated by the reference numeral 54'.

With the embodiment shown here, both the closure cap 16 and the bottom part 11a are injection-moulded; separately in the embodiment shown. The bottom part 11a is manufactured by injection-moulding in the outwardly extended condition or in the pulled out condition of the intermediate piece 45 which can be deformed like a bellows. It is then as shown in FIG. 9. The closure cap 16 is then screwed on, the bottom part 11a is inserted into the hole 14 in the top wall 9, and secured, and the intermediate piece 45 which can be deformed like a bellows is pressed down into the collapsed condition of FIG. 8. This makes it possible for the entire opening device according to FIGS. 8 and 9 to be brought onto the plastics-coated paper web from which the top wall 9 will later be made, wherein the web is then taken onto a supply roll. The web with the opening devices arranged thereon is later taken from the supply roll and shaped into a tube, and is then guided into the pack manufacturing machine which produces the pack shown in FIG. 1. In this case, it is assumed that the pouring device according to FIGS. 8 and 9 is arranged on the top wall 9 in the place of the pouring device shown in FIG. 1.

The embodiment is advantageous, particularly with respect to the injection-moulding and the afore-mentioned features and advantages, in that the diameter of the collar 23a is considerably less than that of the shoulder 25. Therefore, in particular, it is possible for the bottom part 11a to be compressed in the afore-described way and for the distance in the direction of the axis 46, perpendicularly to the top wall 9, to be kept small, so that the pouring device fixed to the paper web does not disturb handling thereof in the pack manufacturing machine.

I claim:

1. A pack for flowing media having at least one substantially flat top wall portion of plastics-coated carrier material having an outer face and an inner face, in which a pouring device is arranged, characterized in that the pouring device has a bottom part containing at least one hole and cover connected thereto and forming a hinge and containing at least one closure cap, wherein a collar having an inner side surrounds the hole outwardly, the closure cap having a sealing lip which can be engaged with the collar, and wherein on the inner side, oppositely disposed in relation to the collar of the bottom part, is arranged a shoulder which projects through a corresponding hole in the top wall portion towards the inside of the pack; wherein the bottom part is welded to at least one of said outer face and said inner face of the top wall portion; wherein the collar on the outside of the bottom part is upstanding and widens outwardly to form an offset portion; and wherein the closure cap has an outer edge which embraces the collar outwardly in the closed condition, the end of said outer edge being of increased thickness inwardly to form a snap-shut bead; and wherein the extension of the shoulder on the bottom part is arranged a fixing edge which extends on the inner face of the top wall portion; and wherein the pack further includes a side wall, with the bottom part of said pouring device containing in a substantially flat connecting web portion two holes of different diameters (D, d) arranged at a spacing (a) apart, the larger diameter hole of which is arranged near a top edge formed between the top wall and side wall of the pack for pouring out the contents, and wherein the pouring edge opposite the hinge of the connecting web portion which embraces the larger hole is partially disposed over the top edge between the top wall and the side wall.

2. A pack according to claim 1, characterized in that the cover is provided with a tear open handle, one end of which is joined to the cover at the side oppositely disposed to the hinge.

3. A pack for flowing media having at least one substantially flat top wall portion of plastic-coated carrier material having an outer face and an inner face in which a pouring device is arranged, characterized in that the pouring device has a bottom part containing at least one hole and a cover containing a closure cap wherein a collar having an inner side surrounds the hole and extends outwardly therefrom, the closure cap having a sealing lip which can be engaged with the collar wherein on the inner side opposite the collar of the bottom part a shoulder is provided at least one of said outer face and said inner face which projects through a corresponding hole in the top wall portion to the inside of the pack, and wherein the bottom part is welded on at least one of the outer face and inner face of the top wall portion.

4. A pack according to claim 3, characterised in that arranged between the collar (23) and the shoulder (25) is an intermediate piece (45) which can be deformed like a bellows, and the collar (23) is provided with an outer thread (50), onto which the inner thread (51) of the closure cap (16) is able to be screwed on in such a way that the sealing lip (24) is disposed inside the collar (23).

5. A method for manufacturing a pack for flowing media having at least one substantially flat top wall portion of plastics-coated carrier material in which a pouring device is arranged which has a bottom part containing at least one hole and a cover containing at one least closure-cap, said method comprising the steps of:

a) providing a continuous web of composite material;

b) moving said continuous web of composite material while simultaneously stamping said material to provide at least one hole therein;

c) providing a serially pouring device comprised of thermoplastics material;

d) placing a pouring device comprised of at least one stamped out hole in the top wall portion;

e) welding said pouring device onto said continuous web with welding means;

f) serially shaping said continuous web into a plurality of tubes;

g) serially filling said tubes with product material;

h) serially welding a tube to form a pack.

6. A method according to claim 5, characterized in that the cover of the pouring device provided in step c) is hingedly connected to the bottom part.

7. A method according to any one of claims 5 or 6, wherein the step of providing a web of composite material comprises providing a web made of aluminum-coated composite material, and wherein step e) of the method further includes the steps of heating said web by induction and joining said web to said pouring device is heated by induction and is joined to the pouring device.

8. The method of claim 5 wherein said web of composite material contains an aluminum coating on at least one side thereof.

9. A tool for carrying out method of manufacturing a pack for flowing media having at least one substantially flat wall portion of plastics-coated carrier material in which a pouring device is arranged which has a bottom part containing at least one hole, and a cover containing at least one closure cap, having a sealing lip disposed thereon in particularly for fixing said pouring device to the top wall portion, said tool comprising heating jaws and companion jaws which can be moved relative to each other, said heating jaws being movably provided on the subsequent inner side of the web for positioning over a hole in the top wall portion, wherein a central projection which in diameters approximately equal to the internal diameter (i) of the sealing lip on the closure cap, and wherein said projection is provided at a height (H) which is somewhat greater than the thickness (B) of the material of the top wall portion.

10. A tool for carrying out a method of manufacturing a pack for flowing media having at least one substantially flat wall portion of plastics-coated carrier material in which a pouring device is arranged which has a bottom part containing at least one hole, and a cover containing at least one closure cap, having a sealing lip disposed thereon in particular for fixing said pouring device to the top wall portion, said tool comprising heating jaws and companion jaws which can be moved relative to each other, said heating jaws being movably provided on the subsequent inner side of the web for positioning over a hole in the top wall portion, wherein a central projection which in diameters approximately equal to the internal diameter (i) of the sealing lip on the closure cap, and wherein said projection is provided at a height (H) which is somewhat greater than the thickness (B) of the material of the top wall portion, wherein said heating jaw is provided with an offset shoulder face portion including an induction-/heating coil carried thereby and embracing said central projection.

* * * * *